United States Patent
Miguez Charines et al.

(10) Patent No.: US 8,943,664 B2
(45) Date of Patent: Feb. 3, 2015

(54) MANUFACTURING METHOD FOR "T" SHAPED STRINGERS WITH AN ANGLE DIFFERENT FROM 90° BETWEEN THE WEB AND THE FOOT

(75) Inventors: Yolanda Miguez Charines, Madrid (ES); Antonio Jose Fuentes Espejo, Madrid (ES); Oscar Miguel Macias Jareno, Madrid (ES); Julian Sanchez Fernandez, Madrid (ES)

(73) Assignee: Airbus Operations, S.L., Madrid (ES)

( * ) Notice: Subject to any disclaimer, the term of this patent is extended or adjusted under 35 U.S.C. 154(b) by 101 days.

(21) Appl. No.: 13/483,782

(22) Filed: May 30, 2012

(65) Prior Publication Data

US 2013/0133171 A1    May 30, 2013

(30) Foreign Application Priority Data

May 30, 2011  (ES) .................................. 201130889

(51) Int. Cl.
| | |
|---|---|
| *B23P 25/00* | (2006.01) |
| *B29C 70/42* | (2006.01) |
| *B29D 99/00* | (2010.01) |
| *B29C 70/34* | (2006.01) |

(52) U.S. Cl.
CPC ............ *B29C 70/42* (2013.01); *B29D 99/0003* (2013.01); *B29C 70/342* (2013.01); *Y02T 50/433* (2013.01); *Y02T 50/43* (2013.01)
USPC ........................................................ 29/458

(58) Field of Classification Search
CPC ....... Y02T 50/43; Y02T 50/433; B29C 70/44; B29C 70/42; B29C 70/40; B29C 65/64; B29C 66/721; B29C 66/43441; B29C 35/02; B29C 65/48; B64C 1/064; B29D 99/0003; B29L 2301/30; B29L 2301/3082; B32B 7/12; B32B 3/06
USPC ........ 29/428, 897, 897.2, 448, 458, 460, 462, 29/464, 466, 468, 469; 264/510, 239, 258; 425/110, 111; 156/306.6, 580
See application file for complete search history.

(56) References Cited

U.S. PATENT DOCUMENTS

| | | | | |
|---|---|---|---|---|
| 3,896,954 | A | * | 7/1975 | Dawson .......................... 37/461 |
| 6,508,909 | B1 | * | 1/2003 | Cerezo Pancorbo et al. ........................... 156/306.6 |
| 2002/0144401 | A1 | * | 10/2002 | Nogueroles Vines et al. ............................. 29/897.2 |
| 2005/0127576 | A1 | * | 6/2005 | Menendez et al. ............ 264/510 |
| 2012/0107435 | A1 | * | 5/2012 | S nchez Fern ndez et al. .............................. 425/110 |

* cited by examiner

*Primary Examiner* — John C Hong
(74) *Attorney, Agent, or Firm* — Oblon, Spivak, McClelland, Maier & Neustadt, L.L.P.

(57) ABSTRACT

Method of manufacturing "T" shaped stringers (1) with an angle different from 90° between the web (2) and the foot (3) whereby the "T" shaped stringers have a stringer web and a stringer foot. The method comprises, after placing together two hot-formed "L" shaped semi-stringers to form a "T" shaped stringer, placing the "T" shaped stringer inside an invar alloy angle leaving a gap between the stringer web and the invar alloy angle. Afterwards, a heating device (7) is moved over the stringer feet (3) surface and a roller (8) slides over said stringer feet (3) surface to adapt the geometry of the stringer feet to the geometry of the invar alloy angle. The resulting "T" shaped stringer is co-bonded on a cured skin with an adhesive line between the stringer and the cured skin, and finally the obtained "T" shaped stringer is cured.

7 Claims, 3 Drawing Sheets

MANUFACTURING METHOD FOR "T" SHAPED STRINGERS WITH AN ANGLE DIFFERENT FROM 90° BETWEEN THE WEB AND THE FOOT

OBJECT OF THE INVENTION

It is an object of the present invention to provide a method of manufacturing "T" shaped stringers which have to be placed on an inclined surface. In those cases, it is necessary to manufacture the stringer with an angle different from 90° between the web and the feet of the stringer.

Thus, it is a further object of the invention to provide a stringer which fits in its theoretical position on the inclined surface where it has to be placed so the use of additional pieces to help the stringer to maintain its position is avoided.

FIELD OF THE INVENTION

The present invention falls within the aeronautical industry and relates to aircraft stringers. More particularly it relates to "T" shaped composite stringers and methods of making these.

BACKGROUND OF THE INVENTION

In aircraft construction, a stringer or longer on or stiffener is a thin strip made of carbon fiber. Several strips are co-bonded on a cured skin in order to build a part of the aircraft (e.g. wings, horizontal tail plane, etc).

A very common type of stringers is that with a "T" shaped cross section defining a stringer web and a stringer foot.

Normally a manufacturing method for a "T" shaped stringer for an aircraft comprises a first step of hot-forming the laminates in order to achieve semi-stringers geometry with an "L" shaped cross section, and a second step of placing together two hot-formed semi-stringers to achieve a "T" shaped stringer. Then, the "T" shaped stringer is co-bonded on a cured skin with an adhesive line between them.

Such method comprises a third step, being a curing cycle. Usually, the curing tools are invar alloy angles of approximately 90° which are placed following the contour of the hot-formed "T" shaped stringer inside a vacuum bag during the curing cycle. It should be noted that invar angles are of 90° sharp when the skin on which the stringers are co-bonded is a flatskin.

When the skin is curved, the angle between the foot and the web of a stringer slightly varies, thus making it necessary to change the angle of the invar angle from 90°. In those cases, the "T" stringer does not fit perfectly the invar alloy angle geometry and it is possible to have deviations with respect to the stringer's theoretical position on the skin.

In the state of the art, when an invar alloy angle with a geometry having an angle different from 90° has to be used, the solution used is to place together the two "L" semi-stringers that form the "T" stringer at different heights. The problem of this solution is that the stringer feet and the surface where it has to be placed do not have the same geometry. When the stringer is placed on its position, there are free spaces between the stringer feet and the surface. Consequently, the union is a low quality union that can lead to future problems in the structure.

Another solution known from the prior art is to bend the feet of the stringer once it has been cured in order to adapt its geometry to the geometry of the surface where it has to be placed. The problem is that this bend of the stringer feet produces folds which are visible and which difficult the assembly of additional elements in the stringer.

The state of the art shows different approaches to T shaped stringer manufacturing process. Document EP 2 052 846 A1 reveals a method of forming a "T" shaped composite structure having a radius filler. Document US 2009/0107312 A1 discloses a method and apparatus to create bends in composite panels. Document U.S. Pat. No. 5,827,383 A shows a method of manufacturing a stiffener reinforced assembly.

DESCRIPTION OF THE INVENTION

The present invention is designed to overcome the above-mentioned drawbacks of "T" shaped stringers which have to be placed on an inclined surface.

All along the present invention the term "invar", also known generically as FeNi36 (64FeNi in the US), is a nickel (36%) and steel (64%) alloy, notable for its uniquely low coefficient of thermal expansion (CTE). The name "invar" derives from the word invariable, referring to its lack of expansion or contraction with temperature changes.

Thus, invar alloys exhibit extremely low expansion around ambient temperatures, making them particularly useful in applications where minimum thermal expansion and high dimensional stability is required, such as in precision instruments like optoelectronic devices, optical and laser benches, electronics, and other kinds of scientific instruments. They also have great applicability in the manufacturing of tools for curing composite materials. The term "composite materials" includes various non-homogeneous polymer-based and non-polymeric based materials, commonly referred to as "reinforced composites", "carbon-fiber composites" or still other terms known in the art.

The present invention provides a manufacturing method for "T" shaped stringers that have to be placed on a curved skin. In those cases, the angle between the foot and the web of a stringer vary slightly from 90°. The invar alloy angles used for the curing of the mentioned stringers have a geometry with an angle between the part which covers the stringer foot and part which covers the stringer web different from 90°.

Hence, the present invention describes a manufacturing method for "T" shaped stringers for an aircraft having a stringer web and a stringer foot, and the method comprising:
- a first step of hot-forming a carbon fiber laminate in order to achieve semi-stringers with an "L" shaped cross-section; for this step, the angle between the stringer foot and the stringer web is 90°;
- a second step of placing together two hot-formed "L" shaped semi-stringers in order to form a "T" shaped stringer; where the two semi-stringers are placed together at different heights;
- a third step of placing the "T" shaped stringer inside an invar alloy angle leaving a gap between the stringer web and the invar alloy angle;
- a fourth step of moving a heating device over the stringer feet surface and sliding a roller over said stringer feet surface;
- a fifth step of co-bonding the resulting "T" shaped stringer on a cured skin with an adhesive line between the stringer and the cured skin; and
- a sixth step of curing the obtained "T" shaped stringer.

The gap between the stringer web and the invar alloy angle before heating and moving the roller should be between 4 to 6 mm for a stringer web thickness between 6 to 10 mm, and between 7 to 9 mm for a stringer web thickness between 10 to 15 mm. In any case, it is quite important to be sure than the stringer is not in contact with the invar angles in any point (the uncured glass fiber and uncured carbon fiber reinforced polymer -CFRP- material have very good tacking properties before curing). This gap can be reduced to 2 mm for thicknesses up to 15 mm if there is a release film between the uncured T stringer and the invar alloy angles.

When carrying out the third step of the method, the invar alloy angle is placed upside down in order to allow the placement of the stringer inside the invar alloy angle so that the surface of the stringer feet can be worked on.

When carrying out the fourth step of the method, the heating device can be for example a dryer or an infrared lamp. The mentioned heating device is used to heat the surface of the stringer feet so its shape can be modified but the temperature is always lower than the temperature necessary for curing the "T" shaped stringer. It could be possible to heat up to 110° C., but 40° C. is recommend in the radius area, measured on the surface in direct contact with the invar angle, 60° C. in the radius area, measured on the surface that it is going to be placed on the cured skin.

When carrying out this fourth step of the method, after moving the heating device over the surface of the stringer foot, when it is already hot, a roller slides over said surface in order to obtain the desired geometry of the stringer.

The rod sliding over the surface of the stringer feet, can slide manually or automatically.

The rod has a covering of a flexible material due to the fact that the stringer foot has different height values, and the rod must be prepared to absorb these height changes. Similarly, the surface upon which the stringer is placed has different thicknesses as well, and the rod surface must deal with this thickness variation.

This manufacturing process produces stringers that are able to fit perfectly over the surface whereon these stringers are placed, optimizing the joint between surface and stringers, and eliminating the use of other elements like wedges to fill the gaps produced with other methods known in the state of the art. Once the stringers have been assembled, they do not move with respect to their theoretical position, increasing the reliability of the manufactured pieces.

Moreover, due to the fact that the stringers fit perfectly with the invar alloy angles along the radius zone, no distortions are produced when the material is cured.

This manufacturing process generates no wrinkles along the stringer radius. Wrinkles along the stringer radius decrease its mechanical properties; therefore, this method produces stronger stringers than other methods known in the state of the art.

BRIEF DESCRIPTION OF THE DRAWINGS

The present invention will be entirely understood on the basis of the following detailed description of the embodiments of the present invention and the accompanying drawings that are presented, solely as an example and which are therefore not restrictive within the present invention, and in which.

REFERENCES

Figure 1A:
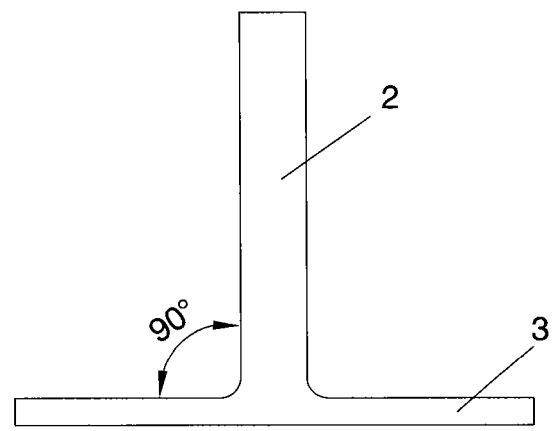
FIG. 1a shows the theoretical geometry of a cured stringer which is going to be placed on a flat surface.

1: "T" shaped stringer
2: stringer web
3: stringer foot
4: cured skin
5: adhesive line
6: invar alloy angle
7: heating device
8: roller
A: angle between the stringer web and the stringer foot
B: distance between the semi stringer feet
C: gap

DESCRIPTION OF A PREFERRED EMBODIMENT

The following description is provided for the benefit of the reader only, and is not intended to limit in any way the invention as set forth by the claims.

FIG. 1a shows the theoretical geometry of a cured stringer which has to be placed on a flat surface. The angle (A) between the stringer web (2) and the stringer foot (3) is 90°.

Figure 1B:
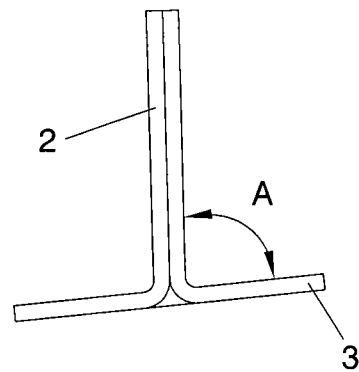
FIG. 1b shows the theoretical geometry of a cured stringer which is going to be placed on a curved surface.

FIG. 1b shows the theoretical geometry of a stringer which has to be placed on a curved surface. The angle (A) between the stringer web (2) and the stringer foot (3) is different from 90°.

Figure 2:
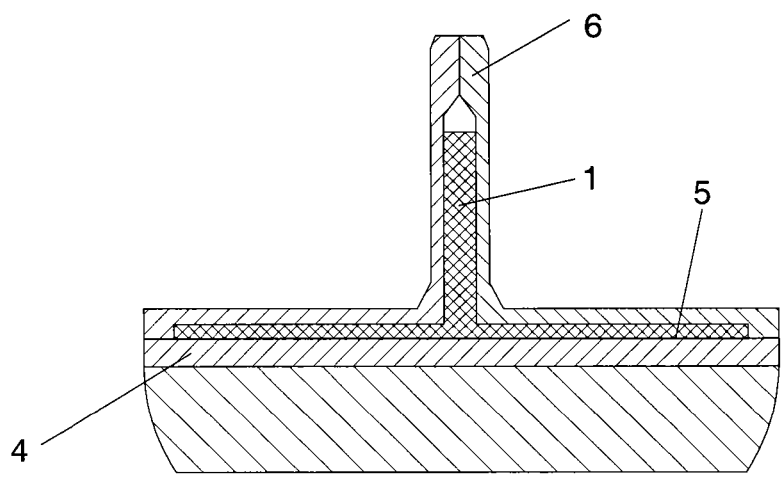
FIG. 2 shows a "T" shaped stringer that is being cured on a cured skin.

In FIG. 2 a "T" shaped stringer (1) is shown, co-bonded to a cured skin (4) with an adhesive line (5) between the stringer (1) and the cured skin (4). In addition, invar alloy angles (6) are placed following the contour of the hot-formed "T" shaped stringer (1).

Figure 3:
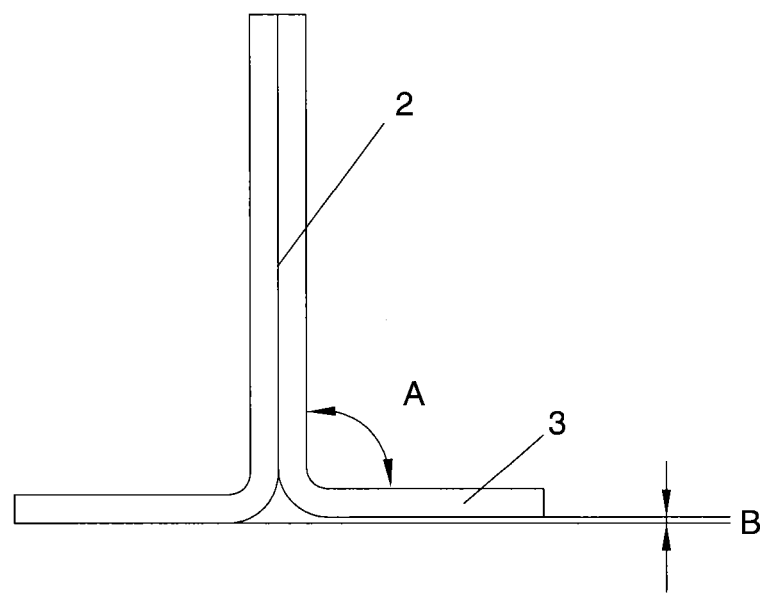
FIG. 3 shows a solution of the state of the art for manufacturing a stringer which is going to be placed on a curved surface. The two semi-stringers are placed together at different heights.

When the skin is curved, the angle (A) between the foot (3) and the web (2) of a stringer varies slightly, thus making the invar alloy angle have an angle between the part covering the web of the stringer and the part covering the foot of the stringer different to 90°. One solution known from the state of the art is shown in FIG. 3 where the two "L" shaped semi-stringers that form the "T" stringer are placed together at different heights leaving a distance (B) between the stringer feet (3). The angle (A) between the stringer web (2) and the stringer foot (3) in those cases is 90°.

Figure 4:
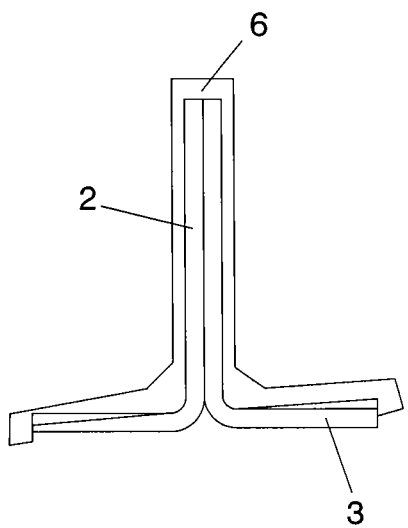
FIG. 4 shows an invar alloy angle with an angle different from 90° designed to manufacture a stringer which is going to be placed on a curved surface.

The solution shown in FIG. 3 illustrates a main disadvantage of the current state of the art: if no other step is made, the "T" shaped stringer does not fit the invar angle geometry. This situation can lead into deviations when fitting the stringer on its theoretical position in the panel. This imperfect fitting is shown in FIG. 4.

The present invention proposes a manufacturing method for "T" shaped stringers that have to be placed on curved surfaces. with this method a stringer which is perfectly adapted to the surface where it has to be placed. is obtained The invar alloy angles used during the method are designed to obtain a stringer with an angle (A) between the stringer web (2) and the stringer foot (3) different from 90°.

In the present method, the geometry of the stringer is adapted to the geometry of the invar alloy angle (6) before being cured so when it is cured it adopts the theoretical shape it has to have.

Figure 5:
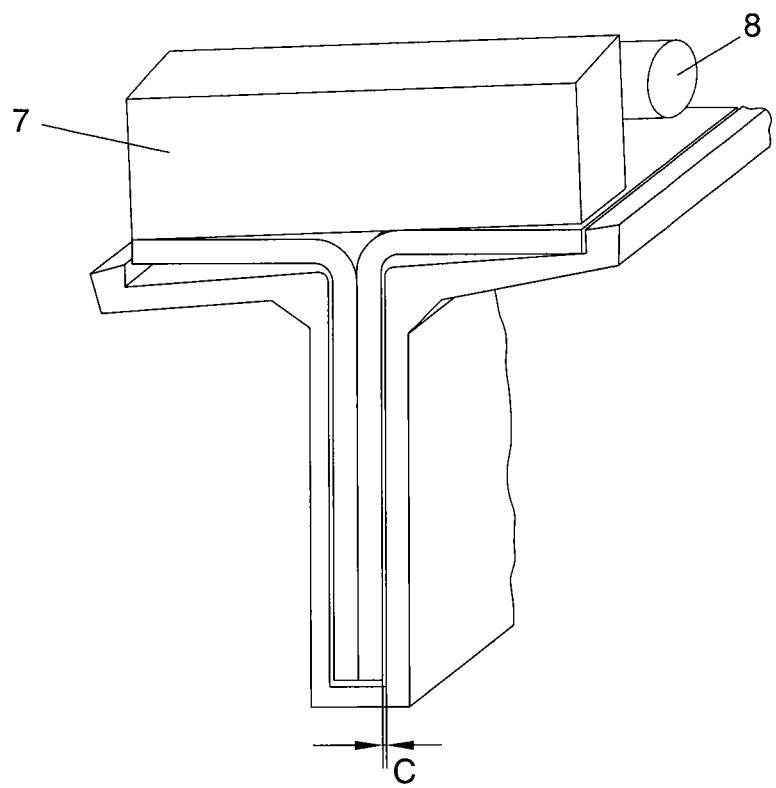
FIG. 5 shows a stringer inside an invar alloy angle with an angle different from 90°, a heating device and a roller used in the present method to modify the geometry of the stringer feet.

Hence, the present invention describes a manufacturing method for "T" shaped stringers for an aircraft having a stringer web and a stringer foot, shown in FIG. 5, the method comprising:

a first step of hot-forming a carbon fiber laminate in order to achieve semi-stringers with an "L" shaped cross-section, a second step of placing together two hot-formed "L" shaped semi-stringers in order to form a "T" shaped stringer (1), a third step of placing the "T" shaped stringer inside an invar alloy angle leaving a gap (C) between the stringer web (2) and the invar alloy angle (6), a fourth step of moving a heating device (7) over the stringer feet (3) surface and sliding a roller (8) over said stringer feet (3) surface, a fifth step of co-bonding the resulting "T" shaped stringer (1) on a cured skin (4) with an adhesive line (5) between the stringer (1) and the cured skin (4), and a sixth step of curing the obtained "T" shaped stringer (1).

In a preferred embodiment of the invention, the gap (C) left between the stringer web (2) and the invar alloy angle (6) is of 5 mm.

The gap between the stringer web and the invar alloy angle before heating and moving the roller should be between 4 to 6 mm for a stringer web thickness of 6 to 10 mm, and between 7 to 9 mm for a stringer web thickness of 10 to 15 mm. In any case, it is quite important to be sure than the stringer is not in contact with the invar angles in any point (the uncured glass fiber and uncured CFRP material have very good tacking properties before curing). This gap can be reduced to 2 mm for thicknesses up to 15 mm if there is a release film between the uncured T stringer and the invar alloy angles.

In another embodiment of the invention, when carrying out the fourth step of the method, the heating device (7) is an infrared lamp even if any other convenient means can be used. Experience has shown that using other heating devices (7) different from infrared lamps make greater heat losses; therefore, the heating device (7) motion speed must be reduced, increasing production times and manufacturing cost as well. So infrared lamps are appropriate heating devices (7) to be used when manufacturing according to this method.

The recommended speed for moving the heating device (7) over the stringer feet (3) surface in an embodiment of the invention is 1 m/5 min. In a preferred embodiment of the invention, the heating device (7) is moved automatically.

In a preferred embodiment, the temperature on the stringer feet (3) surface is lower than 60° and in any case is lower than the temperature needed to cure the stringer (1).

In this fourth step of the method, the roller (8) used to provide the necessary curvature to the stringer feet so that they fit onto the skin where the stringer is going to be placed, is slided over the stringer feet (3) surface right after moving the heating device (7) over the mentioned surface.

The heating device (7) is moved longitudinally along the stringer (1) heating the whole surface of the stringer feet (3). The roller (8) is moved over the surface, sliding over it, behind the heating device (7).

In a preferred embodiment of the invention, the roller (8) has a covering made of a flexible material.

The invention claimed is:

1. A manufacturing method for T-shaped stringers comprising a stringer web and a stringer foot with an angle different from 90° between the web and the foot, the method comprising:

a first step of hot-forming a carbon fiber laminate in order to achieve semi-stringers with an "L" shaped cross-section;

a second step of placing together two hot-formed "L" shaped semi-stringers in order to form a "T" shaped stringer;

a third step of placing the "T" shaped stringer inside an invar alloy angle leaving a gap between the stringer web and the invar alloy angle;

a fourth step of moving a heating device over the surface of the stringer foot and sliding a roller over said surface of the stringer foot;

a fifth step of co-bonding the resulting "T" shaped stringer on a cured skin with an adhesive line between the stringer and the cured skin; and, a sixth step of curing the obtained "T" shaped stringer.

2. The method according to claim 1, wherein when carrying out the third step of the method, the gap is comprised between 4 to 6 mm for a stringer web thickness between 6 to 10 mm, assuring that the stringer is not attached to the invar angles at any point.

3. The method according to claim 1, wherein when carrying out the third step of the method, the gap is comprised between 7 to 9 mm for a stringer web thickness between 10 to 15 mm, assuring that the stringer is not in contact with the invar alloy angles at any point.

4. The method according to claim 1, wherein when carrying out the third step of the method, the gap can be reduced to 2 mm for a stringer web thickness up to 15 mm if there is a release film between the uncured T stringer and the invar alloy angles.

5. The method according to any of claims 1-4, wherein the heating device is an infrared lamp.

6. The method according to claim 1, wherein the roller has a covering made of a flexible material.

7. The method according to claim 1, wherein the heating device speed moving over the stringer feet surface is 1 m/5 min.

* * * * *